(12) United States Patent
Qin et al.

(10) Patent No.: US 11,865,660 B2
(45) Date of Patent: Jan. 9, 2024

(54) WOODWORK MILLING FENCE DEVICE WITH A PRECISION FINE-TUNING FUNCTION

(71) Applicants: Xiaogang Qin, Jiangsu (CN); Qinghai Xu, Jiangsu (CN); Huazhong Sun, Jiangsu (CN)

(72) Inventors: Xiaogang Qin, Jiangsu (CN); Qinghai Xu, Jiangsu (CN); Huazhong Sun, Jiangsu (CN)

(73) Assignee: Harvey woodworking Technology (Nanjing) Co., Ltd., Jiangsu (CN)

( * ) Notice: Subject to any disclaimer, the term of this patent is extended or adjusted under 35 U.S.C. 154(b) by 296 days.

(21) Appl. No.: 17/356,468

(22) Filed: Jun. 23, 2021

(65) Prior Publication Data
US 2022/0355428 A1    Nov. 10, 2022

(30) Foreign Application Priority Data

May 8, 2021    (CN) .......................... 202110500979.9

(51) Int. Cl.
*B23Q 3/00*  (2006.01)
*B27B 27/10* (2006.01)
*B27C 5/04*  (2006.01)

(52) U.S. Cl.
CPC .............. *B23Q 3/007* (2013.01); *B27B 27/10* (2013.01); *B27C 5/04* (2013.01)

(58) Field of Classification Search
CPC ......... B27B 27/02; B27B 27/06; B27B 27/08; B27B 27/10; B27C 5/02; B27C 5/04; B27C 5/06; B23Q 3/005; B23Q 3/007
See application file for complete search history.

(56) References Cited

U.S. PATENT DOCUMENTS 10,532,414 B2 *   1/2020  Smith ................. B23D 45/06
2013/0269835 A1 * 10/2013  Yu .......................... B27C 5/04
                                                                144/253.6

* cited by examiner

*Primary Examiner* — Matthew Katcoff

(57) ABSTRACT

The invention discloses a woodwork milling fence device with a precision fine-tuning function, comprising two guide rods, an electric router fence body, fence board, fence positioning fine-tuning mechanism, fence board fine-tuning mechanism, two fence locking handle devices and an eccentric dust outlet; the guide rods are respectively provided with T-shaped bosses, the T-shaped bosses cooperate with first square nuts and first screws to position the two guide rods in parallel on the electric router fence body, and the fence positioning fine-tuning mechanism is arranged between the two guide rods, and adopts a first dovetail guiding structure, to push the electric router fence body forward or backward; the fence board fine-tuning mechanism is fixed on an aluminum fence, to adjust forward or backward movements of the fence board by the second dovetail guiding structure.

10 Claims, 4 Drawing Sheets

WOODWORK MILLING FENCE DEVICE WITH A PRECISION FINE-TUNING FUNCTION

TECHNICAL FIELD

The invention relates to the field of delicate woodwork manufacture, in particular to a woodwork milling fence device with an accurate positioning and precision fine-tuning function.

BACKGROUND

The woodwork milling fence device is a woodwork milling subsidiary tool equipment, as a relying baseline for workpieces, to assist the workpiece milling, and the woodwork milling fence device, in addition to being as the relying baseline for workpieces, also has functions of adjustable reference, dust collection, protection, etc.;

most woodwork milling fence devices in the market just have the fence function, with no fine-tuning mechanism, unable to position and fine-tune, those with the fine-tuning mechanism are still not precise and usually they are only provided with first-level locking structures, causing deviations of guiding rules during the locking process, and the precision degree can't satisfy use requirements of delicate woodwork;

therefore, it is an urgent problem to be solved for technicians in relevant fields to research and develop a woodwork milling fence device of easy operation with an accurate positioning and precision fine-tuning function.

SUMMARY OF THE INVENTION

To solve the above-mentioned problems, a technical scheme provided in the invention: a woodwork milling fence device with a precision fine-tuning function, comprising two guide rods, an electric router fence body, fence board, fence positioning fine-tuning mechanism, fence board fine-tuning mechanism, two fence locking handle devices and an eccentric dust outlet;

the guide rods are respectively provided with T-shaped bosses, and the T-shaped bosses cooperate with first square nuts and first screws to position the two guide rods in parallel on the electric router fence body, and enable the woodwork milling fence working surface to be parallel to the T-shaped slot of the workbench;

the fence positioning fine-tuning mechanism is arranged between the two guide rods, and is fixed on the electric router fence body by second screws and second square nuts, the fence positioning fine-tuning mechanism is provided with a fine-tuning support, a first dovetail foundation, and is spaced by boss on the fine-tuning support with a positioning hole on the first dovetail foundation and a slot on the electric router fence body, the fence positioning fine-tuning mechanism is also provided with a fence fine-tuning shaft fixed base, a group of T-shaped threaded rods and hand nuts, to position the woodwork milling fence device into the T-shaped slot of the workbench, and the fence positioning fine-tuning mechanism adopts a first dovetail guiding structure, to push the electric router fence body forward or backward;

the fence board fine-tuning mechanism is fixed on an aluminum fence, and the fence positioning fine-tuning mechanism is provided with a second dovetail guiding structure which cuts through the aluminum fence and joins the fence board, to adjust forward or backward movements of the fence board by the second dovetail guiding structure;

the fence locking handle devices are arranged above the woodwork milling fence body, cutting through the two guide rods and the workbench, enabling the fence whose position has been correctly adjusted to be fixed on the workbench;

the eccentric dust outlet is installed on the electric router fence body, comprising a dust collection vent and a dust outlet, and the dust collection vent and the dust outlet adopt a misaligned eccentric design, the dust collection vent is exactly opposite a milling machining position and the dust outlet is arranged at a dust discharge position.

Preferably, the guide rods respectively comprises two bearings at rear of two ends and the guide rods are slotted in the middle of two ends, the slotted middle part is provided with a thread tensioning mechanism and the tensioning mechanism by tensioning screws—screwing, unscrewing, controls the offset from bearings to two sides of guide rods.

Preferably, the T-shaped bosses are vertical to the guide rods and the T-shaped bosses are provided with through holes which fit the first square nuts and the first screws.

Preferably, one side of the T-shaped threaded rods is provided with positioning pins.

Preferably, the first dovetail guiding structure comprises a group of first double nuts and threaded rods arranged on the fence fine-tuning shaft fixed base and first dovetail sliders arranged on the first dovetail foundation, and the first dovetail sliders cooperate with threaded rods, one end of the threaded rods penetrates the first dovetail sliders and the fence fine-tuning shaft fixed base in sequence, and equips itself with fine-tuning knob 1 and graduation ring 1, the fence fine-tuning shaft fixed base is provided with a reference scale, and the graduation 1 on the dovetail foundation, by twisting the fine-tuning knob 1, drives the first dovetail sliders to move and thereby pushing the electric router fence body forward or backward.

Preferably, the interior of the first double nuts is provided with compression springs to eliminate the fitting clearance between threaded rods and nuts, and the first dovetail slider is slotted and provided with a thread tensioning mechanism, to effectively eliminate the dovetail clearance by adjusting tensioning screws.

Preferably, the second dovetail guiding structure comprises a group of fine-tuning threaded rods and second double nuts arranged on the fence board fine-tuning shaft fixed base and second dovetail sliders arranged on the second dovetail foundation, and the second dovetail sliders cooperate with fine-tuning threaded rods, one end of the fine-tuning threaded rods penetrates the second dovetail sliders and the fence board fine-tuning shaft fixed base in sequence, and equips itself with second fine-tuning knobs and second graduation rings, driving the second dovetail sliders to move and thereby adjusting forward or backward movements of the fence board by twisting the second fine-tuning knobs, and the fence board fine-tuning mechanism is provided with the second graduation.

Preferably, the board fine-tuning mechanism is provided with the fence board fine-tuning shaft fixed base and the second dovetail foundation, and is fixed on the electric router fence body by third screws and third square nuts, the second dovetail sliders are connected with the fence board fine-tuning support and fence board fixed blocks, and the fence board fixed blocks partly cut through the woodwork milling fence body and connect the fence board by dovetail locking rods.

Preferably, the second dovetail slider is slotted and provided with a thread tensioning mechanism, to eliminate the dovetail fitting clearance by adjusting tensioning screws.

Preferably, the fence locking handle devices comprise fence locking handles, fence locking handle fixed bases and bolts for T-shaped slot, and the fence locking handles, the fence locking handle fixed base 7B and the bolts for T-shaped slot are arranged below the workbench, and the electric router precision fence device whose position has been correctly adjusted is fixed on the workbench.

With the adoption of the above-mentioned schemes, the invention has the following advantages:

(1) T-shaped bosses designed onto two guide rods can quickly position the two guide rods in parallel on the woodwork milling fence body, and enable the electric router milling fence working surface to be vertical to T-shaped slot of the workbench; four bearings on each guide rod make guided slide smoother; the guide rods are slotted in the middle of two ends, and they are provided with thread tensioning mechanisms, by controlling tensioning mechanisms, to effectively eliminate the clearance between guide rods and T-shaped slots, making movements of the woodwork milling fence device originally with a precision fine-tuning function smoother and moving processes more stable, with a simple and easy operation.

(2) The fence positioning fine-tuning mechanism, by a group of T-shaped threaded rods and hand nuts on the fence fine-tuning shaft fixed base, can tentatively install the woodwork milling fence device with a precision and fine-tuning function into the T-shaped slot of the workbench; then by twisting the fine-tuning knob, the distance between woodwork milling fence devices and electric router cutting tools can be adjusted, and the double nuts structure in the fine-tuning mechanism effectively eliminates the thread fitting clearance, the guiding adopts the dovetail structure, and sets up the tensioning mechanism, to eliminate the dovetail clearance by adjusting the tensioning screws, making movements stable, and making adjustments convenient, and by referring to graduation rings and linear scales, to fine-tune and position the feed amount. The product after the preliminary positioning, is pushed partly by the fine-tuning mechanism, and the adjustment process is easy and precise, avoiding the situation where in the current market products' fine-tuning need integrally move the electric router fence device, and the drawbacks of no preliminary positioning, no baseline and no capability of precision fine-tuning.

(3) Designs of the fence board fine-tuning mechanism, break the current adjustment pattern of woodwork milling compensation amounts, the current adjustment pattern of compensation amounts is accomplished by adding gaskets or diaphragms of fixed thickness, and the adjustment process need assemble and disassemble electric router milling fences, with tedious operations, also with thickness limitations of gaskets or diaphragms to adjustment amounts. The fence board fine-tuning mechanism is provided with fine-tuning mechanism, and cuts through the woodwork milling fence body, and is fixed and connected with the fence board, directly adjusting compensation amounts according to requirements by fine-tuning mechanism, with no need of disassembly and assembly; and compensation fine-tuning mechanism also adopts the double nuts structure to eliminate the fitting clearance between threaded rods and nuts; Dovetail guide rail cooperates with the thread tensioning mechanism, to effectively eliminate the dovetail fitting clearance, making movements stable, and making adjustments convenient, in addition to set up graduation rings and moving scale indication, satisfying readings of flat tuning and fine-tuning, making the fine-tuning of compensation amounts more precise and convenient.

(4) The woodwork milling fence device with a precision fine-tuning function adopts two fence locking handles by cutting through bolts for T-shaped slots on the workbench to lock the workbench, and to separate the adjustment function from the locking and positioning function of the device, effectively solving the defects of fence devices of the same type in the current market, where deviations of the fence position are caused during locking processes due to the adjustment with no positioning, improving the precision degree and the reliability of products.

(5) According to the rotation direction of sawdust and dust during cutting processes of electric router cutting tools, with simulation analysis of Gas-Solid Two-Phase Flows, dust outlets of the woodwork milling fence device with a precision fine-tuning function adopt an eccentric design, during the dust collection processes, avoiding the problem of sawdust flow disorder, and the dust collecting and gathering effect is far superior to woodwork milling fences in the market.

BRIEF DESCRIPTION OF THE DRAWINGS

To more clearly describe technical schemes of the invention's embodiments, the drawings needed to be used in the embodiment are briefly introduced below, and what should be understood is that the drawings below just represent part of the invention's embodiments, so they shouldn't be regarded as a limitation to scope, and for common technicians in the field, with the premise of no creative work, they can acquire other relevant drawings according to these ones.

Figure 1:
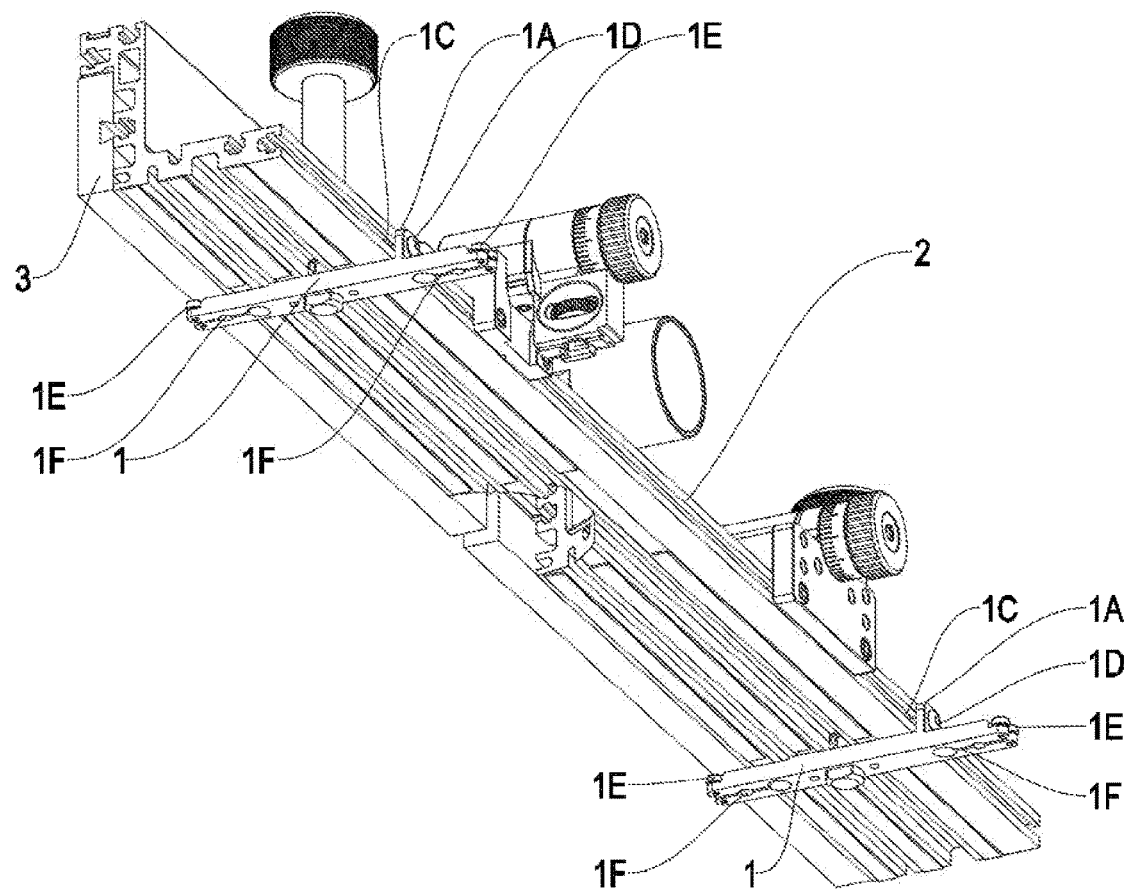
FIG. 1 is a setting schematic diagram for the two guide rods of a woodwork milling fence device with a precision fine-tuning function of the invention.

As shown in the drawings: 1. two guide rods, 2. electric router fence body, 3. fence board, 4. fence positioning fine-tuning mechanism, 5. fence board fine-tuning mechanism, 6. eccentric dust outlets, 7. fence locking handle devices, 8. workbench;

1A. T-shaped bosses, 1B. through holes, 1C. first square nuts, 1D. first screws;

4A. fine-tuning support, 4B. second screws, 4C. second square nuts, 4D. T-shaped threaded rods, 4E. positioning pins, 4F. hand nuts, 4G. fence fine-tuning shaft fixed base, 4I. first graduation ring, 4J. first fine-tuning knob, 4K. first double nuts, 4L. threaded rods, 4M. first dovetail foundation, 4N. first dovetail sliders, 4O. first graduation, 4P. tensioning screws;

5A. fence board fine-tuning shaft fixed base, 5B. second dovetail foundation, 5C. third screws, 5D. third square nuts, 5E. second dovetail sliders, 5F. fine-tuning threaded rods, 5H. second double nuts, 51. fence board fine-tuning support, 5J. fence board fixed blocks, 5K. dovetail locking rods, 5L. tensioning screws, 5M. second graduation rings, 5N. second graduation, 5O. second fine-tuning knobs;

7A. fence locking handle devices, 7B. fence locking handle fixed bases, 7C. bolts for T-shaped slot;

DESCRIPTION OF EMBODIMENTS

To make the purpose, technical schemes and advantages of the embodiment in the invention clearer, with the combination of drawings attached in the embodiment of the invention, a clear and complete description about technical schemes of the embodiment in the invention will be given below, and obviously, described embodiments are a part of those in the invention other than all embodiments. Usually components of the invention's embodiments, described and represented and in the drawings herein, can be arranged and designed with various configurations.

Therefore, the following detailed description of the invention's embodiments provided in the drawings is not intended to restrict the scope of the invention where protection is claim, but merely to present the selected embodiments of the invention. Based on embodiments of the invention, all other embodiments acquired by common technicians in the field without the premise of doing the creative work, are within the protection scope of the invention.

What should be noted is that similar labels and letters represent similar items in the drawings below, and therefore, once some item is defined in one drawing, then it doesn't need to be defined and explained in the following drawings.

In the description of the invention, it should be understood that the orientation or positional relationship indicated by the terms "center", "upper", "lower", "left", "right", "vertical", "horizontal", "inner", "outer", etc. are based on the orientation or positional relationship shown in the drawings, or are the usually placed orientation or positional relationship when the invention product is used, and it is only for the convenience of describing the invention and simplifying the description, but not indicate or imply that the pointed device or element must have a specific orientation, be constructed and operated in a specific orientation, and therefore cannot be understood as a limitation of the invention. In addition, the terms "first", "second" and "third" are only used for distinguishable and descriptive purposes, and cannot be understood as indicating or implying relative importance.

In addition, the occurrence of terms such as "horizontal", "vertical", "pendulous" and so on doesn't mean components are required to be absolutely horizontal or vertical, but can be slightly tilted. For example, "horizontal" just means its direction is more horizontal compared with "vertical", and it doesn't mean the structure must be completely horizontal, but can be slightly tilted.

In the description of embodiments in the invention, "plurality" means two at least.

In the description of embodiments in the invention, it also need be explained that, unless otherwise clearly stipulated and defined, the occurrence of terms "setting", "installation", "link" and "connection" should be understood in a broad sense, and for example, it can be a fixed connection, can also be a detachable connection, or an integral connection; it can be a mechanical connection or an electrical connection; it can be a direct connection, and can also be an indirect connection through an intermediary, it can be the internal connection of two components. For common technicians in the field, they can understand the specific meaning of the above-mentioned terms in the invention according to specific situations.

EMBODIMENTS

Figure 2:
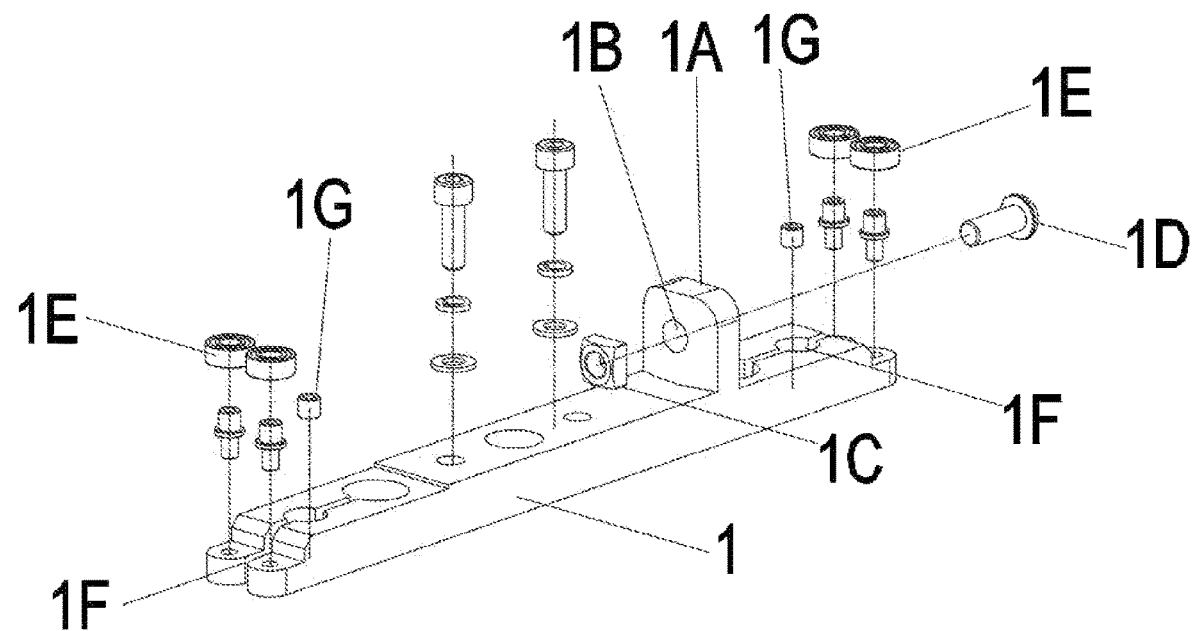
FIG. 2 is a structural schematic diagram for the two guide rods of a woodwork milling fence device with a precision fine-tuning function of the invention.

A woodwork milling fence device with a precision fine-tuning function, comprising two guide rods 1, fence positioning fine-tuning mechanism 4, fence board fine-tuning mechanism 5, two fence locking handle devices 7 and an eccentric dust outlet 6;

Combined with FIG. 1 and FIG. 2, the two guide rods 1 is provided with a T-shaped boss 1A, T-shaped boss 1A is vertical to guide rods 1, T-shaped boss 1A is provided with through holes 1B, cooperating with first square nuts 1C and first screws 1D to position the two guide rods 1 in parallel on the fence body 2, enabling the fence board 3 working surface to be parallel to the T-shaped slot of the workbench, each guide rod 1 is provided with four bearings 1E, respectively installed at the rear of two ends of guide rod 1, two bearings 1E at each end, and guide rods 1 cut a slot IF in the middle of two ends and the middle part of slot IF is provided with a thread tensioning mechanism, by screws 1G—screwing, unscrewing, controlling the offset from bearings 1E to two sides of guide rods 1, to eliminate the clearance between guide rods 1 and the T-shaped slot of the workbench.

Figure 3:
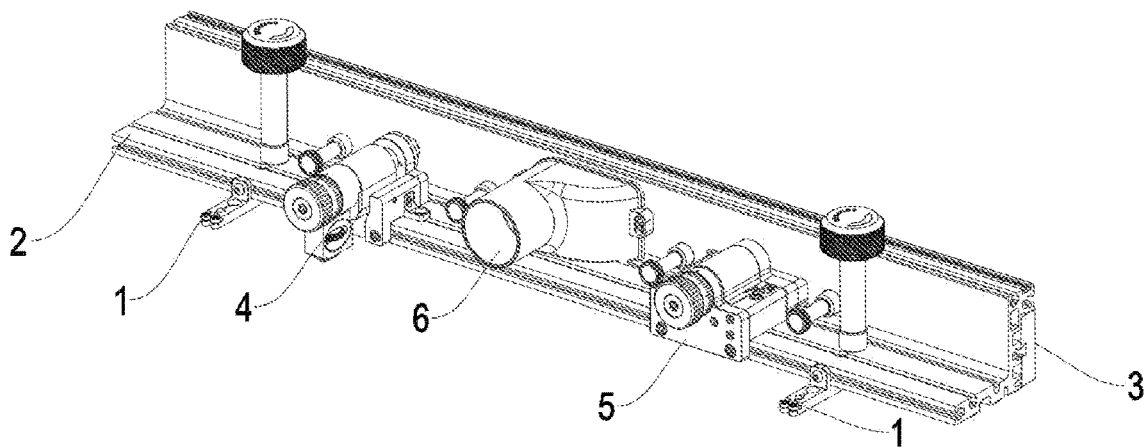
FIG. 3 is a setting schematic diagram for the fence positioning fine-tuning mechanism of a woodwork milling fence device with a precision fine-tuning function of the invention.
Figure 4:
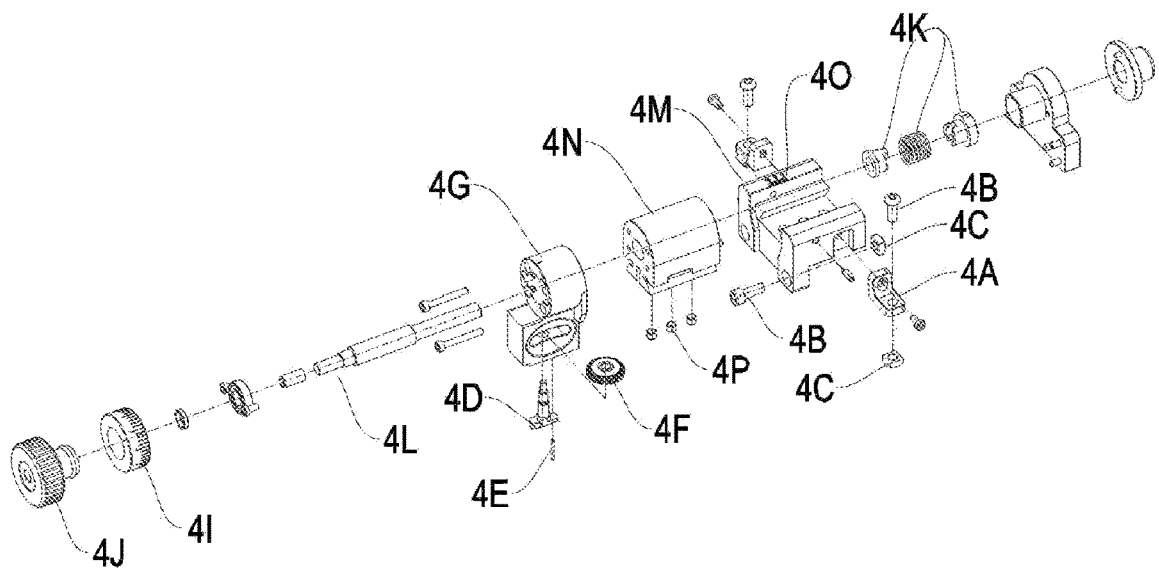
FIG. 4 is a structural schematic diagram for the fence positioning fine-tuning mechanism of a woodwork milling fence device with a precision fine-tuning function of the invention.

Combined with FIG. 3 and FIG. 4, the fence positioning fine-tuning mechanism 4 is arranged between the two guide rods 1 and is spaced by boss on the fine-tuning support 4A with a positioning hole on the first dovetail foundation 4M and a slot on the electric router fence body 2, fixed on the electric router fence body 2 by second screws 4B and second square nuts 4C; the fence positioning fine-tuning mechanism 4 is also provided with a fence fine-tuning shaft fixed base 4G, a group of T-shaped threaded rods 4D and hand nuts 4F, to position the electric router fence body into the T-shaped slot of the workbench, and one side of the T-shaped threaded rods 4D is provided with positioning pins, functioning as stop of turning, easy to lock and loosen; the fence fine-tuning shaft fixed base 4G is provided with a feeding fine-tuning mechanism of a group of first double nuts 4K and threaded rods 4L, driving the first dovetail sliders 4N on the first dovetail foundation 4M to push the electric router fence body 2 forward or backward, and the interior of the first double nuts 4K is provided with compression springs to completely eliminate the fitting clearance between threaded rods and nuts, and the first dovetail sliders 4N are slotted and provided with a thread tensioning mechanism, to effectively eliminate the dovetail clearance by adjusting tensioning screws 4P, and threaded rods 4L are equipped with the first fine-tuning knobs 4J and the first graduation rings 4I, cooperating with a reference scale on the fence fine-tuning shaft fixed base 4G and the first graduation 4O on the dovetail foundation, by adjusting the first fine-tuning knob 4J, fine-tuning the place of the electric router fence body, with no movement clearance, and precisely ensuring the feed amount of the electric router fence device according to number of degrees of graduation on the first graduation rings 44-4I and the first graduation 4O on the first dovetail foundation 4M.

Figure 5:
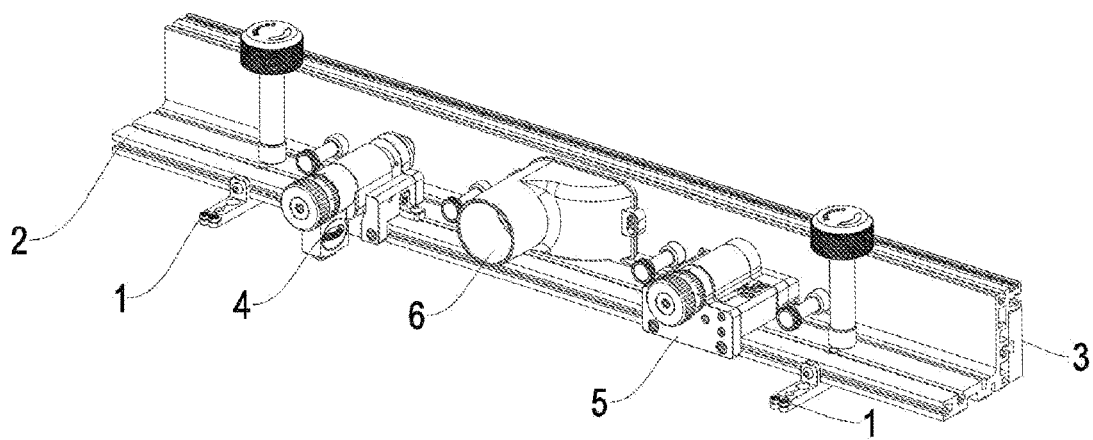
FIG. 5 is a setting schematic diagram for the fence board fine-tuning mechanism of a woodwork milling fence device with a precision fine-tuning function of the invention.
Figure 6:
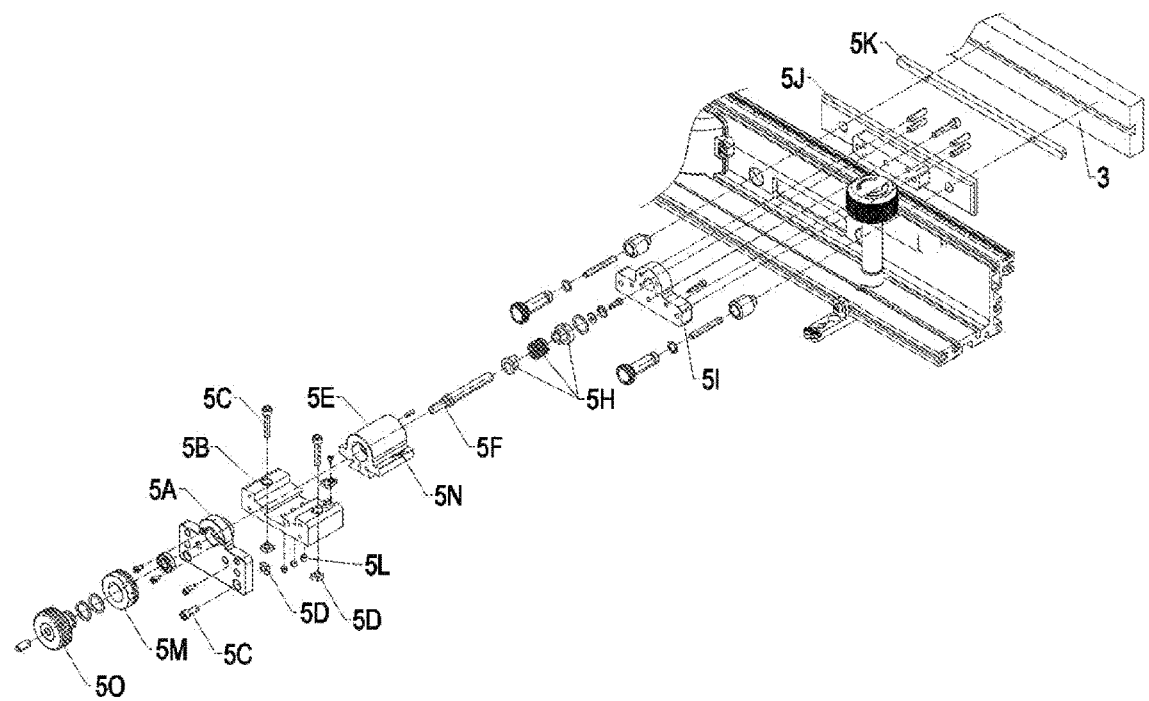
FIG. 6 is a structural schematic diagram for the fence board fine-tuning mechanism of a woodwork milling fence device with a precision fine-tuning function of the invention.

Combined with FIG. 5 and FIG. 6, the board fine-tuning mechanism 5 is provided with fence board 3, fine-tuning shaft fixed base 5A and the second dovetail foundation 5B, and is fixed on the electric router fence body 2 by third screws 5C and third square nuts 5D, and the second dovetail sliders 5E are connected with fence board fine-tuning support 51 and fence board fixed blocks 5J and the fence board fixed blocks 5J partly cut through the woodwork milling fence body 2, connected with the fence board 3 by dovetail locking rods 5K; the board fine-tuning mechanism 5 is provided with a feeding mechanism of a group of fine-tuning threaded rods 5F and second double nuts 5H and second double nuts 5H can completely eliminate the fitting clearance between threaded rods and nuts, and the second dovetail sliders 5E is slotted and provided with a thread tensioning mechanism, to eliminate the dovetail fitting clearance by adjusting tensioning screws 5L, the fine-tuning threaded rods 5F are equipped with the second fine-tuning knobs 5O and the second graduation rings 5M, driving the second dovetail sliders 5E to precisely adjust forward or backward movements of the fence board 3 by twisting the second fine-tuning knobs 5O, satisfying the requirements of workpieces after milling to position changes of fence; apart from graduation rings, the fence board fine-tuning mechanism 5 is also provided with a group of the second graduation 5N, satisfying readings of flat tuning and fine-tuning, making the adjustment of compensation amounts more precise.

Figure 7:
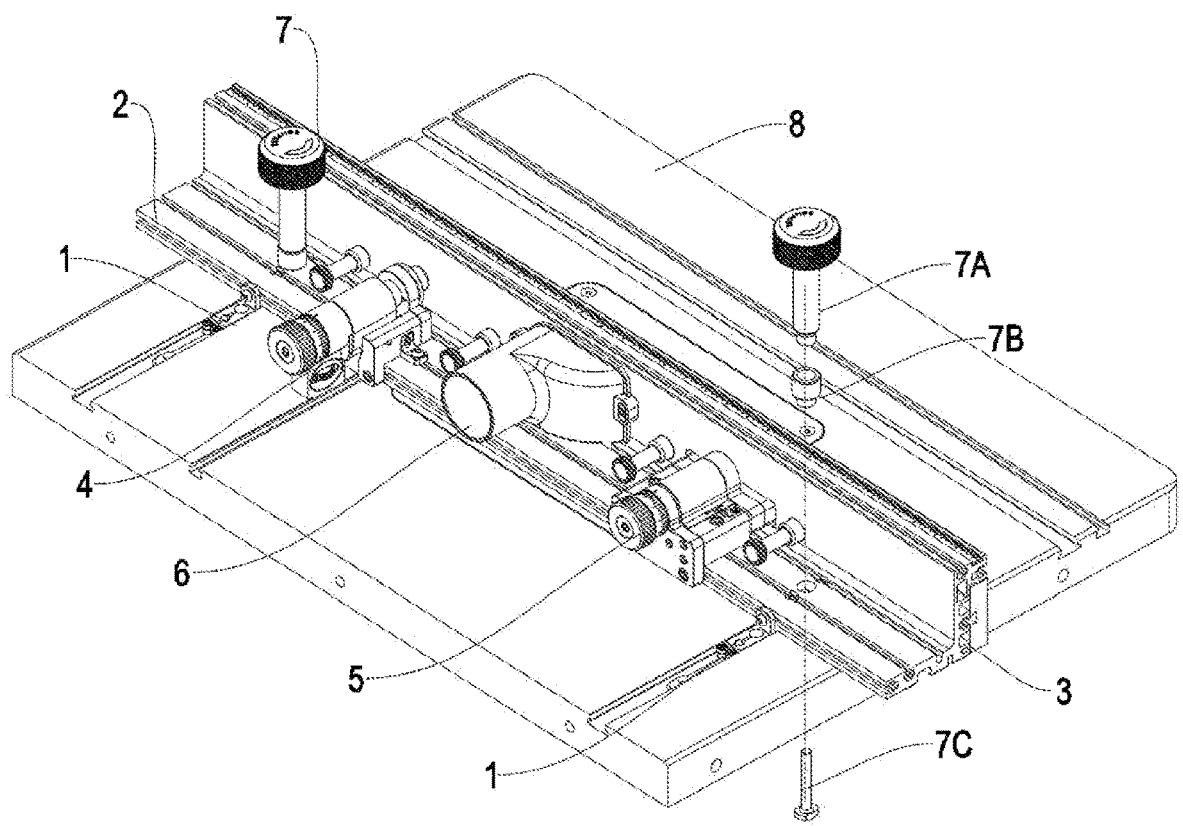
FIG. 7 is a structural schematic diagram for the fence locking handle devices of a woodwork milling fence device with a precision fine-tuning function of the invention.

Combined with FIG. 7, the two fence locking handle devices 7, comprise fence locking handles 7A, fence locking handle fixed bases 7B and bolts for T-shaped slot 7C, wherein fence locking handles 7A and fence locking handle fixed base 7B are arranged above electric router fence body 2, cutting through two guide rods 1 and workbench 8, and bolts for T-shaped slot 7C are arranged below the workbench 8, which can firmly fix the electric router precision fence device whose position has been correctly adjusted on the workbench.

Figure 8:
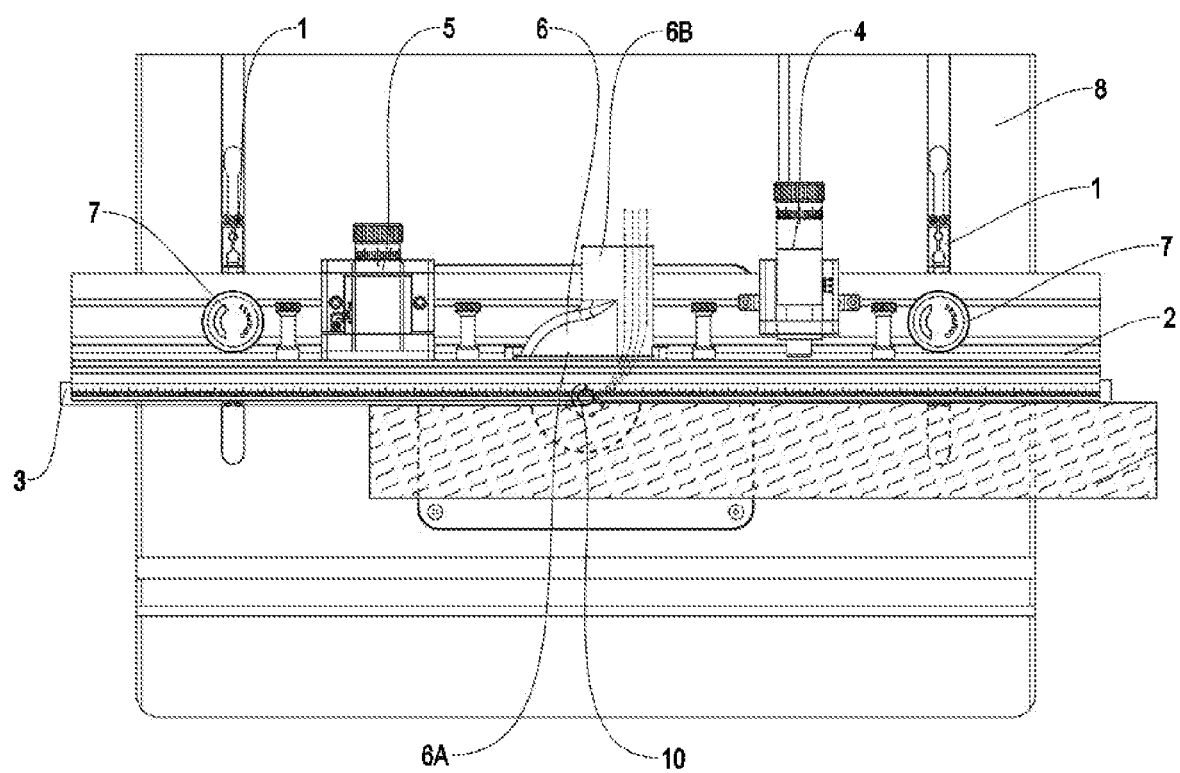
FIG. 8 is a structural schematic diagram for the two eccentric dust outlets of a woodwork milling fence device with a precision fine-tuning function of the invention.

Combined with FIG. 8, the eccentric dust outlet 6 is installed on the electric router fence body 2, and dust collection vent 6A and dust outlet 6B adopt a misaligned eccentric design, the dust collection vent is exactly opposite a milling machining position 10, and the eccentric dust outlet is arranged at a dust discharge position, effectively gathering and collecting sawdust and dust of cutting.

The invention and its embodiments are described above, and the description has no restrictions, what is shown in the drawings is only one of embodiments in the invention, and the actual structure is not limited to this. In a word, if common technicians in the field are inspired by it, with the situation where aims of the invention are not estranged, structures and embodiments similar to the technical scheme without creative designs, shall fall within the protection scope of the invention.

The invention claimed is:

1. A woodwork milling fence device with a precision fine-tuning function, comprising two guide rods, an electric router fence body, fence board, fence positioning fine-tuning mechanism, fence board fine-tuning mechanism, two fence locking handle devices and an eccentric dust outlet;
the guide rods are respectively provided with T-shaped bosses, and the T-shaped bosses cooperate with first square nuts and first screws to position the two guide rods in parallel on the electric router fence body, and enable the woodwork milling fence working surface to be parallel to the T-shaped slot of the workbench;
the fence positioning fine-tuning mechanism is arranged between the two guide rods, and is fixed on the electric router fence body by second screws and second square nuts, the fence positioning fine-tuning mechanism is provided with a fine-tuning support, a first dovetail foundation, and is spaced by boss on the fine-tuning support with a positioning hole on the first dovetail foundation and a slot on the electric router fence body, the fence positioning fine-tuning mechanism is also provided with a fence fine-tuning shaft fixed base, a group of T-shaped threaded rods and hand nuts, to position the woodwork milling fence device into the T-shaped slot of the workbench, and the fence positioning fine-tuning mechanism adopts a first dovetail guiding structure, to push the electric router fence body forward or backward;
the fence board fine-tuning mechanism is fixed on an aluminum fence, and the fence positioning fine-tuning mechanism is provided with a second dovetail guiding structure which cuts through the aluminum fence and joins the fence board, to adjust forward or backward movements of the fence board by the second dovetail guiding structure;
the fence locking handle devices are arranged above the woodwork milling fence body, cutting through the two guide rods and the workbench, enabling the fence whose position has been correctly adjusted to be fixed on the workbench;
the eccentric dust outlet is installed on the electric router fence body, comprising a dust collection vent and a dust outlet, and the dust collection vent and the dust outlet adopt a misaligned eccentric design, the dust collection vent is exactly opposite a milling machining position and the dust outlet is arranged at a dust discharge position.

2. The woodwork milling fence device with a precision fine-tuning function according to claim 1, wherein the guide rods respectively comprises two bearings at rear of two ends and the guide rods are slotted in the middle of two ends, the slotted middle part is provided with a thread tensioning mechanism and the tensioning mechanism by tensioning screws—screwing, unscrewing, controls the offset from bearings to two sides of guide rods.

3. The woodwork milling fence device with a precision fine-tuning function according to claim 2, wherein the T-shaped bosses are vertical to the guide rods and the T-shaped bosses are provided with through holes which fit the first square nuts and the first screws.

4. The woodwork milling fence device with a precision fine-tuning function according to claim 1, wherein one side of the T-shaped threaded rods is provided with positioning pins.

5. The woodwork milling fence device with a precision fine-tuning function according to claim 1, wherein the first dovetail guiding structure comprises a group of first double nuts and threaded rods arranged on the fence fine-tuning shaft fixed base and first dovetail sliders arranged on the first dovetail foundation, and the first dovetail sliders cooperate with threaded rods, one end of the threaded rods penetrates the first dovetail sliders and the fence fine-tuning shaft fixed base in sequence, and equips itself with fine-tuning knob 1 and graduation ring 1, the fence fine-tuning shaft fixed base is provided with a reference scale, and the graduation 1 on the dovetail foundation, by twisting the fine-tuning knob 1, drives the first dovetail sliders to move and thereby pushing the electric router fence body forward or backward.

6. The woodwork milling fence device with a precision fine-tuning function according to claim 5, wherein the interior of the first double nuts is provided with compression springs to eliminate the fitting clearance between threaded rods and nuts, and the first dovetail slider is slotted and provided with a thread tensioning mechanism, to effectively eliminate the dovetail clearance by adjusting tensioning screws.

7. The woodwork milling fence device with a precision fine-tuning function according to claim 1, wherein the second dovetail guiding structure comprises a group of fine-tuning threaded rods and second double nuts arranged on a fence board fine-tuning shaft fixed base and a second dovetail sliders arranged on a second dovetail foundation, and the second dovetail slider cooperate with fine-tuning threaded rods, one end of the fine-tuning threaded rods penetrates the second dovetail slider and the fence board fine-tuning shaft fixed base in sequence, and equips itself with second fine-tuning knobs and second graduation rings, driving the second dovetail slider to move and thereby adjusting forward or backward movements of the fence board by twisting the second fine-tuning knobs, and the fence board fine-tuning mechanism is provided with a second graduation.

8. The woodwork milling fence device with a precision fine-tuning function according to claim 1, wherein the board fine-tuning mechanism is provided with a fence board fine-tuning shaft fixed base and a second dovetail foundation, and is fixed on the electric router fence body by third screws and third square nuts, the second dovetail sliders are connected with the fence board fine-tuning support and fence board fixed blocks, and the fence board fixed blocks partly cut through the woodwork milling fence body and connect the fence board by dovetail locking rods.

9. The woodwork milling fence device with a precision fine-tuning function according to claim 7, wherein the second dovetail slider is slotted and provided with a thread tensioning mechanism, to eliminate the dovetail fitting clearance by adjusting tensioning screws.

10. The woodwork milling fence device with a precision fine-tuning function according to claim 1, wherein the fence locking handle devices comprise fence locking handles, fence locking handle fixed bases and bolts for T-shaped slot, and the fence locking handles, the fence locking handle fixed base 7B and the bolts for T-shaped slot are arranged below the workbench, and the electric router precision fence device whose position has been correctly adjusted is fixed on the workbench.

\* \* \* \* \*